Dec. 13, 1960 H. R. WILD 2,964,627
DOUBLE-FOCUSSING SPECTROMETER FOR
ELECTRICALLY CHARGED PARTICLES
Filed May 15, 1958 3 Sheets-Sheet 1

Inventor —
HERMANN ROLF WILD
By his attorney

Dec. 13, 1960 H. R. WILD 2,964,627
DOUBLE-FOCUSSING SPECTROMETER FOR
ELECTRICALLY CHARGED PARTICLES
Filed May 15, 1958 3 Sheets-Sheet 3

Inventor –
HERMANN ROLF WILD
By his attorney.

United States Patent Office 2,964,627
Patented Dec. 13, 1960

2,964,627

DOUBLE-FOCUSSING SPECTROMETER FOR ELECTRICALLY CHARGED PARTICLES

Hermann Rolf Wild, Freiburg, Switzerland, assignor to Trüb, Taüber & Co., A.G., Zurich, Switzerland Filed May 15, 1958, Ser. No. 735,584

Claims priority, application Switzerland July 1, 1957

6 Claims. (Cl. 250—41.9)

The present invention relates to a double-focussing spectrometer for electrically charged particles. For the better understanding of the invention firstly the principles of magnetic double-focussing will be briefly explained:

As is well known, in a double-focussing spectrometer use is made of the fact that a charged particle in a homogeneous magnetic field describes a circle (normal trajectory) when entering the field perpendicularly to the lines of force thereof, and that certain deviations from the homogeneity of the field about the circle of the normal trajectory make it possible to bring particles entering the field at a certain angle to the normal trajectory again to intersection with the normal circle at a predetermined point, namely as far as deviations in the plane of the normal circle are concerned as well as those in a direction perpendicular to it.

The form of the field required for the double-focussing is known and is determined by the following conditions:

(1) the lines of force stand perpendicular to the normal circle.

(2) the field is rotationally symmetrical with respect to the axis of rotation of the normal circle (Z-axis).

(3) the z-component of the field is defined by $$H_z = H_0(1 - \tfrac{1}{2}\rho_0 + \beta\rho_0^2) \qquad (1)$$

wherein $H_0$ is the field strength on the normal circle, $\rho_0$ is the relative deviation from the normal circle in the radial direction, and $\beta$ is a constant defined by the theory of focussing errors, which may assume different values depending on the requirements made of the apparatus.

For apparatuses having a high resolving power the values $\beta = \tfrac{1}{8}$ and $\beta = \tfrac{3}{8}$ are particularly suited according to theory.

In spectrometers for particles of high energy, for which high field strengths are necessary, it has been attempted to obtain the necessary field form by appropriate design of the magnet pole shoes, and this attempt has been successful to a certain extent. Such a spectrometer has a high resolving power in the measuring range for which it is designed, but this measuring range is very small. Obviously, only those particles which have a certain energy move on the normal circle with the radius $a$ at a certain given field strength. The number of these particles is ascertained by a receiver, e.g. a Geiger counter. Then the field strength is successively varied, e.g. by varying the intensity of an exciter current, in order that at any time particles of different energy may reach the receiver, the number of which particles is ascertained. With variation of the field strength, however, the permeability of the material of the magnet and of the pole shoes is also varied, which entails a distortion of the field. The double-focussing is therefore maintained in a very small range of measurements only.

For small particle energies an iron-free magnetic circuit has been provided in the spectrometers, and the realisation of the desired field form has been attempted by appropriate arrangement of several coils. Obviously such spectrometers are unsuitable for high particle energies.

The present invention has the main object of overcoming the above difficulties and of providing a double-focussing magnetic spectrometer suitable for highly electrically charged particles and having a wide range of measurements.

With this and other objects in view, which will become apparent hereinafter, I provide a double-focussing magnetic spectrometer for electrically charged particles, comprising in combination: an annular vacuum chamber, a source emitting electrically charged particles into the said vacuum chamber substantially tangentially to a normal circle, a receiver means for the said electrically charged particles arranged in the said vacuum chamber, on the said normal circle at the focussing point thereon, a magnetic circuit containing ferro-magnetic material, and electromagnetic means for varying the strength of the magnetic field acting on the said charged particles while compensating the concomitant changes in the magnetic properties of the said ferro-magnetic material, so that the field form required for the double-focussing of the said electrically charged particles is maintained at high field strengths as well as at low field strengths.

In the accompanying drawings—

Figure 1:
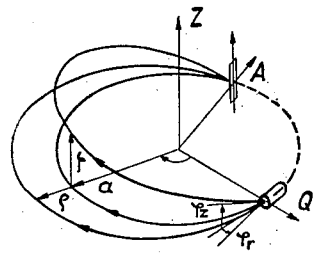
Fig. 1 shows, diagramatically, three trajectories of charged particles of equal energy in a spectrometer according to the invention.

In Fig. 1 three trajectories of charged particles of equal energy in a spectrometer are diagrammatically illustrated.

The trajectory having the radius $a$ is the normal trajectory (circle). For particles which follow this trajectory there is the condition that they emerge from a source Q of charged particles at an issuing angle of zero. A particle emerging at an angle $\varphi_r$ deviates from the normal circle in the radial direction. The amount of the deviation is $\rho$, and becomes again zero at the station of the receiver A. For a particle having the axial issuing angle $\varphi_z$ the axial deviation from the normal trajectory is $\zeta$. This deviation becomes zero at the same point as the radial deviation in a double-focussing spectrometer.

Figure 2:
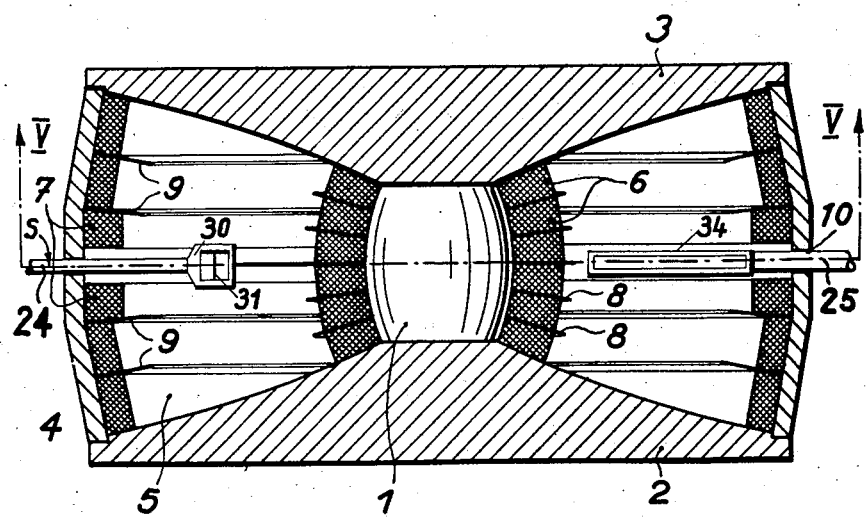
Fig. 2 is a diametrical section of the magnetic system of the spectrometer.
Figure 3:
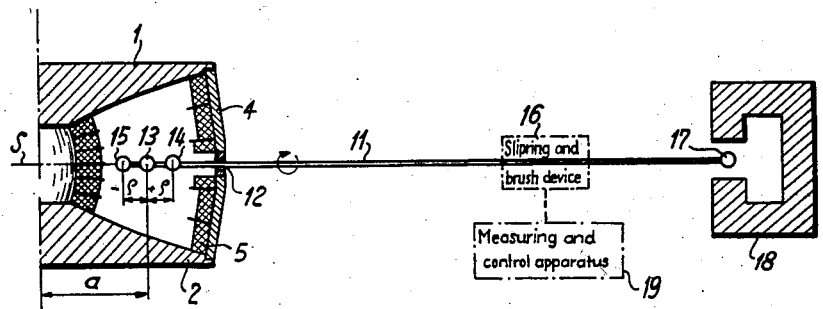
Fig. 3 is a section taken at a different diametrical plane of this magnetic system, with some additional details, on a smaller scale.
Figure 4:
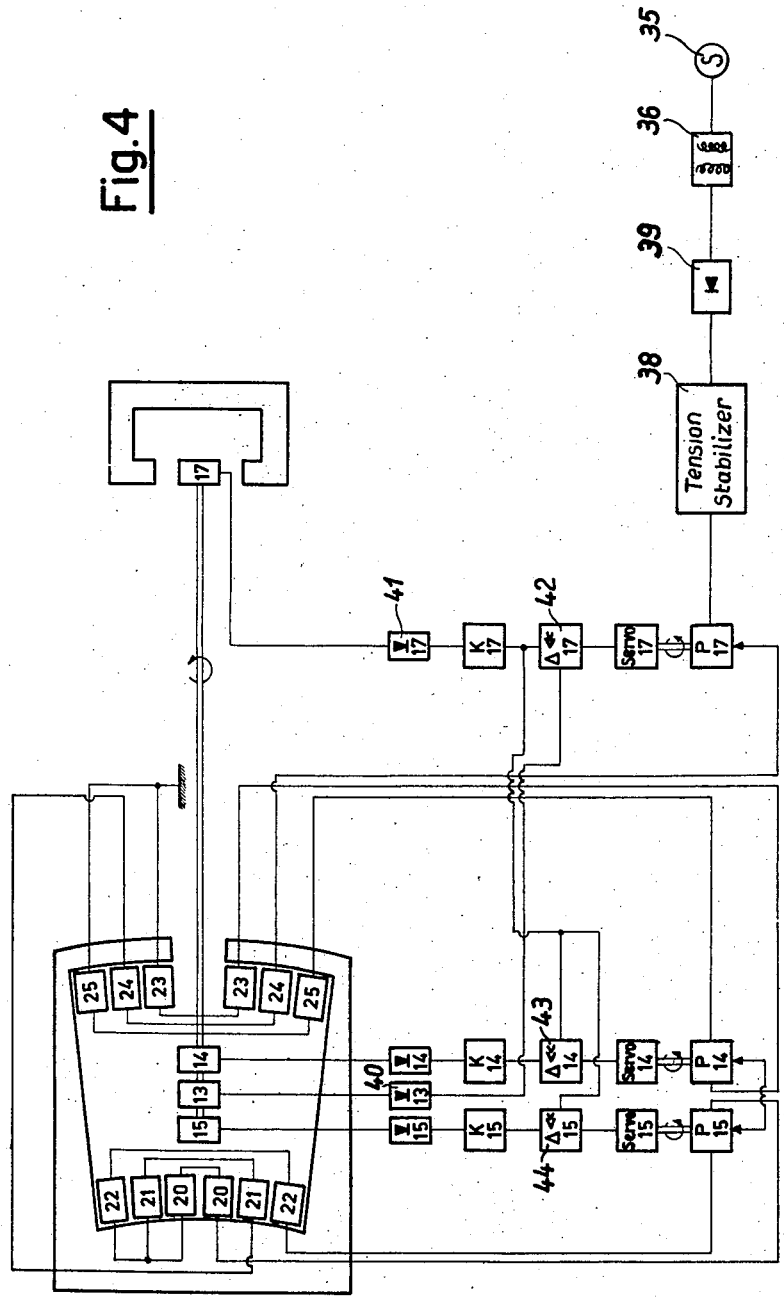
Fig. 4 is a wiring diagram of a stabiliser arrangement, shown connected to an apparatus similar to that illustrated in Fig. 3.

In Figs. 2 to 4 of the accompanying drawings the components necessary for an understanding of the invention are illustrated by way of example in an embodiment of a spectrometer according to the invention.

In Fig. 2, 1 denotes a centrally arranged core of ferro-magnetic material which abuts at its top and bottom disc-shaped pole shoes 3 and 2, respectively.

This disc shaped pole shoes 2 and 3 are connected to one another at their external edges by a cylindrical shell 4, which is likewise made of ferro-magnetic material.

The components described enclose an annular vacuum chamber 5 in which two systems of exciter coils 6 and 7 are accommodated, one of which (6) is arranged on the central core 1 and the other (7) on the inside of the cylindrical shell 4. Both coil systems are composed of six individual coils each, between which magnetically conductive intermediate layers 8 and 9, respectively, are arranged, which protrude beyond the coils into the chamber 5.

The vacuum chamber 5 is accessible by means of a tightly sealable aperture 10, through which a source of electrons or ions and a receiver, e.g. a Geiger counter, may be introduced into the chamber. Naturally several apertures 10 may be provided along the circumference of the chamber. The magnet system illustrated has a plane of symmetry S. Any two individual coils lying symmetrically to this plane are connected with one another in series. The currents flowing in the three pairs of coils are excited independently of one another in such a manner that the field form corresponding to the Equation 1 is always maintained. This is so even when on the normal circle with the radius $a$, which lies in the plane of symmetry S, the field strength is varied in a very wide range by the variation of the exciter currents. It has been proved experimentally that by the arrangement of individually excited coils or pairs of coils alone, without the magnetically conductive intermediate layers 8 and 9, respectively, the desired result could not be attained, and likewise not by the provision of the intermediate layers 8 and 9 alone, without varying the intensity of the currents in the pairs of coils in a differential way.

If the permeability of the iron were an unequivocal function of the magnetic field strength, the magnet system according to Fig. 2 would completely fulfil the requirements made with suitable excitations ascertained once and finally experimentally for the various field strengths. With the sorts of iron generally used however the hysteresis phenomena are so strong that for completely attaining the aim of the invention, an arrangement must be employed such as that diagrammatically shown in Fig. 3.

According to Fig. 3 a rotary shaft 11 penetrates through an aperture 12 into the vacuum chamber 5, provisions for a satisfactory sealing of the aperture 12 of course being made. The shaft 11 is radially positioned and lies in the plane of symmetry S of the magnet system. On the shaft 11, in the interior of the vacuum chamber 5, three small coils 13, 14 and 15 are mounted, the planes of which are parallel to the axis of the shaft.

The coil 13 lies on the normal circle having the radius $a$, the coil 14 lies at a distance $+\rho$, and the coil 15 at a distance $-\rho$ therefrom. By the rotation of the coils voltages are generated in the same, which depend on the actual local strength of the magnetic field. These voltages are transmitted by conductors (not shown) running in the interior of the shaft 11 by means of a slip ring and brush device 16 to a measuring and control apparatus 19.

On the shaft 11 there is mounted outside the vacuum chamber 5 yet a fourth small coil 17, which rotates in a magnetic field generated by a reference magnet 18. The voltage induced in the coil 17 is transmitted by the brush device 16 likewise to the aforesaid measuring and control apparatus, and serves for comparison with the voltages induced in the coils 13—15. In case the voltages do not correspond to their design values, the exciter currents of the three pairs of coils are automatically so varied that the desired field is attained which may be achieved by means known in themselves.

The spectrometer described may alternatively be so designed that film records of the energy spectrum of the charged particles can be taken by means of it at any desired sections of its wide measuring range. For this purpose the magnet system has to be so laid out and excited that the field form of the Equation 1 corresponds to the factor $\beta=\frac{3}{8}$. In this case double-focussing is attained not only for particles of an energy corresponding to the normal circle but also for particles of a somewhat higher or lower energy. For the former the focussing point lies slightly outside, for the latter slightly inside the normal circle. The connecting line of all focussing points, i.e. the focal line, is not a straight line passing through the focussing point lying on the normal circle, but a substantially S-shaped curve.

Figure 5:
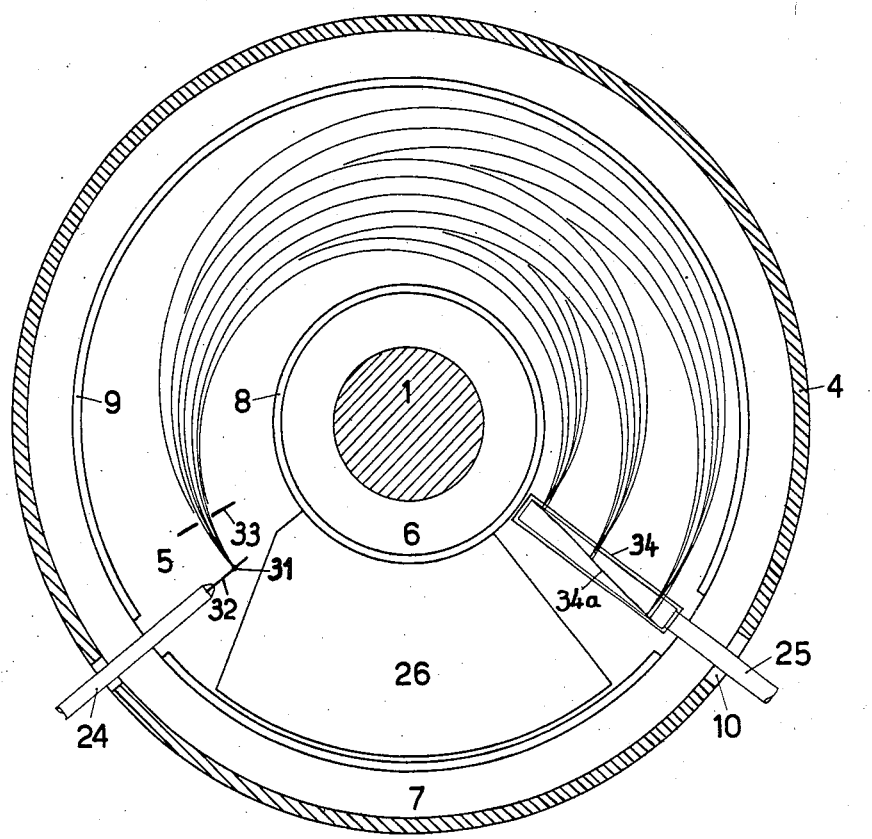
Fig. 5 is a cross-section taken on the line V—V of Fig. 2.

In Figs. 2 and 5, a probe holder 24 carries a bearing frame 30. Across the frame there extends a wire 31 coated, as by evaporation or sublimation, with the substance to be investigated. This substance, having previously been irradiated in a cyclotron or the like, or in a nuclear reactor, constitutes the source of particles. It is to be noted that no means are provided for introducing $\beta$ particles from an accelerator into the spectrograph. A screen 33 with a gap therein limits the particle beam emitted by the wire 31.

A second holder 25 carries the camera 34 and a slightly S-shaped track 34a of the film is positioned within the camera 34.

As a receiver a small photographic camera is provided exchangeably with the Geiger counter, wherein the film lies on a path corresponding to the focal line. With such a photographic camera small ranges of the energy spectrum of the electrically charged particles can be recorded with high resolving power directly on the film. By varying the field strength stepwise and arranging the individual records in series, finally the whole spectrum from high energies down to low ones can be ascertained.

Considering the spectrometer as a magnetic lens, the focussing plane is the geometrical locus of the focal points of this lens for the various particle impulses. This focussing plane is slightly inclined with respect to the radial direction, and curved. Now this inclination and curvature are dependent apart from the coefficients $\alpha$ and $\beta$ of the field development, upon the diaphragm angle (i.e. the angle between the source and the diaphragm as seen from the axis of symmetry), the inclination and curvature increasing with increasing diaphragm angle. However, a positive diaphragm angle does not exist for which the inclination and curvature disappear completely, but for sufficiently small diaphragm angles the curvature remains so small that the focussing plane can be approximated by a plane which is slightly inclined with respect to the radial direction.

The camera is then mounted in such a manner that the plane surface of the film lies in the focussing plane. Then three exchangeable inserts are available as a camera:

(1) A simple film holder (for individual measurements).

(2) A holder for four films (series measurements): the four films are fitted to the sides of a rotatable square profile.

(3) A rotary film holder (measurements depending on time): a film is fitted on a cylinder which slowly rotates uniformly.

Referring now to Fig. 4:

Stabilization of the field intensity and of the field form is obtained in the following way: The voltage of the source 35 generates in known manner through a transformer 36, a rectifier 37 and a voltage stabilizer 38, a D.C. voltage that has only a superimposed alternating wave smaller than the tolerable variations of the field for the desired resolution power of the apparatus (order of magnitude $10^{-4}$). The stabilized voltage is fed to the windings of the magnet through a regulating resistance 39 and flows through these windings e.g. in the following order:

$$24/24 \longrightarrow 21/21 \longrightarrow \{{20/20 \atop 22/22}\} \longrightarrow P15 \longrightarrow P14 \longrightarrow \{{23/23 \atop 25/25}\} \longrightarrow \text{ground.}$$

The potentiometers P14 and P15 are supposed at first to be positioned in the central position. The windings 20 to 25 are likewise dimensioned for this resting position so that in the said circuit each of the 12 windings contributes the same amount of the field excitation.

In another example also the windings 21 and 24 are parallel; then all the windings have the same number of turns.

It is clear, that a variation of the regulating resistance 39, means a variation of the overall field of the magnet. This is used to stabilize the field on the desired value in the following manner:

The rotating pick-up-winding 13 measures continuously the field $H_0$ generated by the windings 20 to 25 on the circle of radius $a$ (see Fig. 1). The reference winding 17 measures the reference field $H_r$ of a permanent magnet shielded from external influences and temperature-stabilized. $H_r$ is constant by definition, while $H_0$ may vary in consequence of external influences or voltage-variations or temperature-effects. The object is, to stabilize $H_0$ with the aid of $H_r$. For this purpose the alternative voltages generated in the windings 13 and 17 are rectified in the rectifiers 40 and 41. The rectified voltages are applied to a differential amplifier 42, that amplifies only the positive or negative differences of these voltages and causes the servomotor 17 to rotate accordingly in negative or positive direction. The regulating resistance P17 mounted on the axis of the servomotor rotates also and corrects—if the rotating directions are correctly chosen—the current in the windings of the magnet, so that the difference of the fields is always zero, i.e. that $H_0=H_r=$constant. In such way a field stabilization is obtained, however only for the field intensity $H_0=H_r$. In order to maintain $H_0$ variable within a wide range, but nonetheless stabilized, a voltage divider K17 is interposed between rectifier 41 and differential amplifier 42. This is done in order to reduce the voltage supplied by rectifier 41 by an adjustable factor K, so that $$H_o=\frac{H_r}{K}$$

Consequently by regulating K17 the field intensity $H_0$ of the magnet can be adjusted to the desired value. The adjustment is made e.g. by hand, while the adjusted voltage is kept constant automatically by the described servomechanism.

The field form, represented by the differences from $H_0$ measured by the windings 14 and 15, is determined only approximatively by the form of the pole shoes 2 and 3 of the magnet. This field form must be corrected by the currents of the windings 20, 22, 23 and 25. This is possible by appropriate adjustment of the potentiometers P14 and P15, that cause a change of the field in proximity of the normal radius, without changing the field $H_0$ on the normal radius itself. When these potentiometers are adjusted so that at the locus of the rotating windings 14 and 15 field differences are measured, that correspond to Equation 1, the necessary field form is obtained.

In order to maintain this field form the alternative currents induced in windings 14 and 15 are rectified and supplied through two voltage dividers K14 and K15 to two differential amplifiers 43 and 44. There these voltages are compared with $$\frac{H_r}{KY}=H_o$$

The differences drive the servomotors servo 14 and servo 15 and so the potentiometers P14 and P15. If the necessary ration of $$\frac{H(a-\rho)}{H_o}$$

(at the locus of winding 15) and $$\frac{H(a-\rho)}{H_o}$$

(at the locus of winding 14) for the correct field form is adjusted at the tension dividers K15 and K14, an automatic stabilization of the field form is also obtained.

While I have described herein and illustrated in the accompanying drawing what may be considered typical and particularly useful embodiments of my said invention, I wish it to be understood that I do not limit myself to the particular details and dimensions described and illustrated, for obvious modifications will occur to a person skilled in the art.

What I claim as my invention and desire to secure by Letters Patent, is:

1. A double-focussing magnetic spectrometer for electrically charged particles, comprising in combination: an annular vacuum chamber, a source emitting electrically charged particles substantially tangentially to a normal circle into the said vacuum chamber, a receiver means for the said electrically charged particles arranged in the said vacuum chamber on the said normal circle at the focussing point thereon, a magnet system comprising a central core, two pole shoes and a shell of ferro-magnetic material enclosing the said vacuum chamber between them, one electric coil system mounted on the said central core, another electric coil system arranged on the inside of the said shell, each of the said coil systems including individual coils, and magnetically conductive intermediate layers mounted on the said core and shell, respectively, and protruding beyond the edges of the said coils, at least three of the said individual coils being electro-magnetically excitable independently of the others.

2. A double-focussing magnetic spectrometer as claimed in claim 1, wherein each of the said two coil systems comprises six individual coils arranged symmetrically in pairs, the individual coils forming a pair of coils being electrically connected to one another in series.

3. A double-focussing magnetic spectrometer as claimed in claim 2 comprising means for controlling the exciter currents flowing through the said individual coils.

4. A double-focussing magnetic spectrometer as claimed in claim 3, comprising a rotary shaft extending in a vacuum tight manner radially from outside into the said annular vacuum chamber, three control coils mounted on the said rotary shaft: one located on the said normal circle, another outside and the third inside thereof, sliprings arranged on the said shaft outside the said vacuum chamber and connected to the said control coils, respectively and brushes contacting the said sliprings and connected to an external measuring- and control apparatus automatically controlling the exciter currents of the said two coil systems and the field form generated by the same.

5. A double-focussing magnetic spectrometer as claimed in claim 4, comprising a reference magnet outside the said vacuum chamber, a fourth control coil mounted on the said rotary shaft within the field of the said reference magnet, slip rings on the said rotary shaft connected to the said fourth coil, and brushes contacting the said slip rings and transmitting the voltage induced in the said fourth coil as a reference voltage to the said external measuring- and control apparatus.

6. A double-focussing magnetic spectrometer for electrically charged particles, comprising in combination: an annular vacuum chamber, a source emitting electrically charged particles substantially tangentially to a normal circle into the said vacuum chamber, a photographic camera arranged in the said vacuum chamber on the said normal circle at the focussing point thereon, a magnetic circuit containing ferro-magnetic material, and electromagnetic means for varying the strength of the magnetic field acting on the said charged particles while compensating the concomitant changes in the magnetic properties of the said ferro-magnetic material, the said magnetic circuit being so laid out and excited in the whole measuring range, that the field form generated satisfies the equation $H_2=H_0(1-\frac{1}{2}\rho_0+\beta\rho_0^2)$ with the constant $\beta=\frac{3}{8}$, wherein $H_2$ means the axial field strength at any point within the effective range of the rotationally symmetrical magnetic field, $H_0$ means the axial field strength on the said normal circle, and $\rho_0$ the relative deviation from the said normal circle in the radial direction, the said photographic camera having a film track curved corresponding to the focal line of the double-focussing.

References Cited in the file of this patent
UNITED STATES PATENTS

| | | |
|---|---|---|
| 2,394,071 | Westendrop | Feb. 5, 1946 |
| 2,617,026 | Bierman | Nov. 4, 1952 |
| 2,652,533 | Lush | Sept. 15, 1953 |
| 2,658,150 | Backus et al. | Nov. 3, 1953 |
| 2,675,470 | Wideroe | Apr. 13, 1954 |